United States Patent [19]

Purchase

[11] 3,811,072

[45] May 14, 1974

[54] SCANNING DEVICE

[75] Inventor: Francis Jack Purchase, Kitchener, Ontario, Canada

[73] Assignee: Autotelic Industries, Ltd., Ontario, Canada

[22] Filed: Oct. 16, 1972

[21] Appl. No.: 297,830

[52] U.S. Cl. ........................ 315/169 TV, 330/169 R

[51] Int. Cl. ........................ H05b 39/00

[58] Field of Search ........................ 315/169 TV

[56] References Cited

UNITED STATES PATENTS

| | | | |
|---|---|---|---|
| 3,703,657 | 11/1972 | Shesser | 315/169 TV X |
| 3,624,273 | 11/1971 | Gale | 315/169 TV X |
| 3,662,214 | 5/1972 | Lustig | 315/169 TV X |

*Primary Examiner*—Nathan Kaufman

*Attorney, Agent, or Firm*—John A. Young, Esq.

[57] ABSTRACT

A scanning device in which an array of cathodes are in opposed relation to a matrix of anodes. The cathodes are successively addressed with one row of anodes being addressed for each cycle of addressing the cathodes. The anodes on the ends facing away from the cathodes have photosensitive elements and interposed between the photosensitive elements and the source of illumination therefor are electrically operable shutters which expose successive groups of the rows of the anodes during a scanning cycle.

15 Claims, 7 Drawing Figures

SCANNING DEVICE

The present invention relates to a scanning device and is particularly concerned with a scanning device that is efficiently operable with a minimum of electrical connections thereto.

Scanning devices for reading printed material or for being actuated by some other optical means are known and usually comprise a matrix of elements arranged in rows and columns with a connection to each row and each column. When connections are made to each row and column of such a matrix, a great many terminals must be provided, and the external circuitry for detecting signals in the matrix becomes extremely complex.

With the foregoing in mind, the primary object of the present invention is the provision of a highly efficient scanning device which can be operated by relatively simple circuitry and with a minimum number of connections to the device.

Another object is the provision of a scanning device in which the external circuitry is relatively simple.

Still another object of the invention is the provision of a scanning device so constructed and arranged that selective control is provided over the regions of the scanning device which is effective at any given moment.

These and other objects and advantages of the present invention will become more apparent upon reference to the following detailed specification taken in connection with the accompanying drawings in which.

BRIEF SUMMARY OF THE INVENTION

Figure 1:
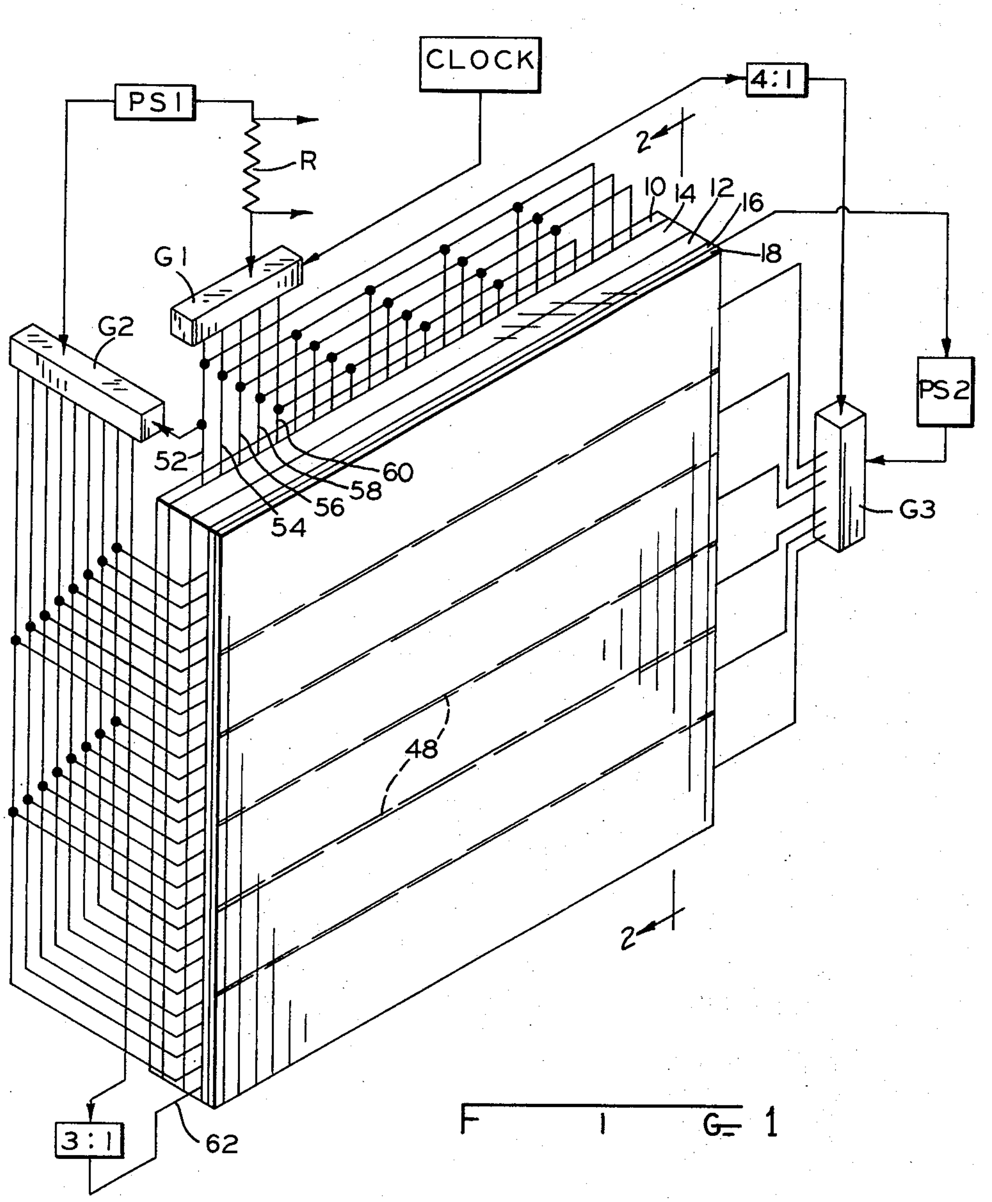
FIG. 1 is a somewhat diagrammatic perspective view showing a device according to the present invention with typical external circuity connected thereto.
Figure 3:
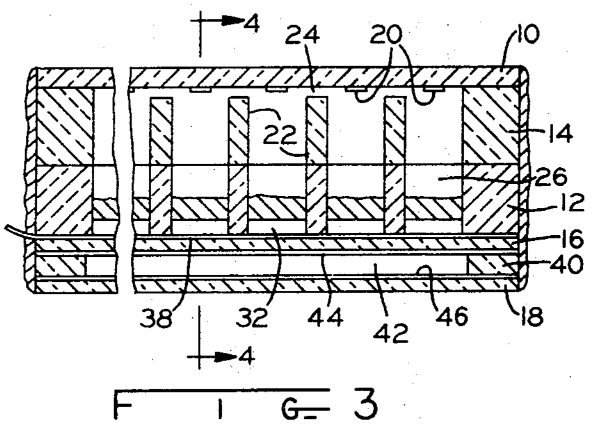
FIG. 3 is a fragmentary plan section drawn at enlarged scale and indicated by line III—III on FIG. 2.
Figure 4:
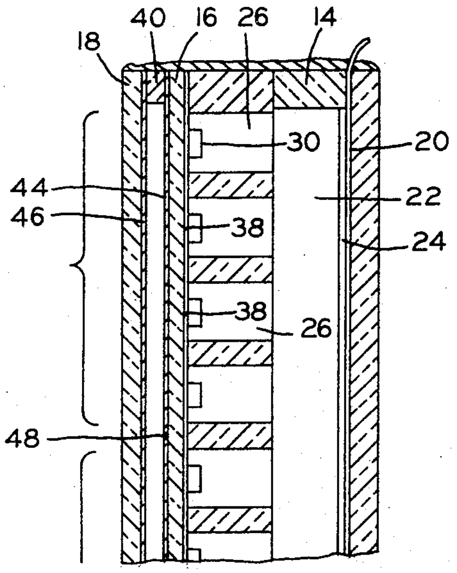
FIG. 4 is a fragmentary vertical section indicated by line IV—IV on FIG. 3.
Figure 2:
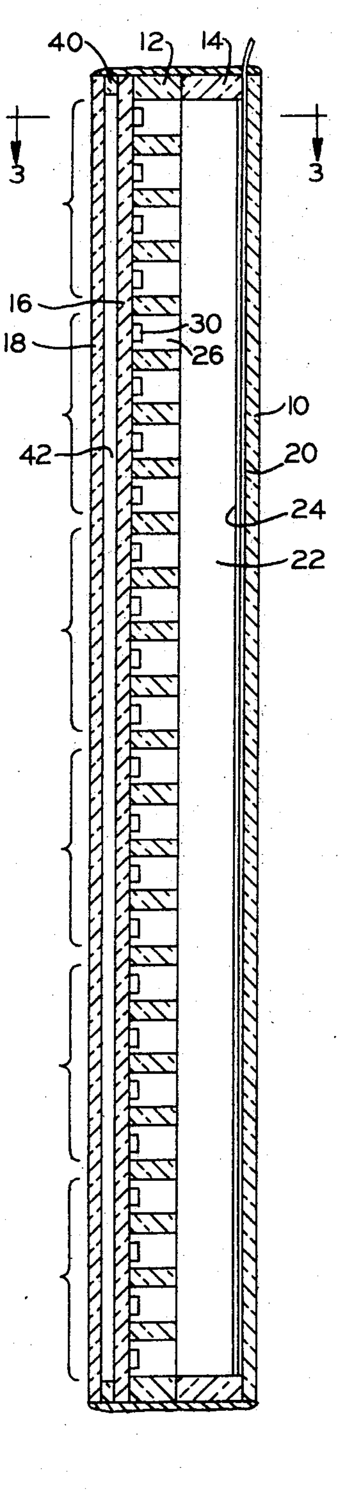
FIG. 2 is a vertical section indicated by line II—II on FIG. 1.

According to the present invention, a matrix of anodes arranged in rows and columns have one end directed toward cathodes extending along the rows in spaced relation thereto with an ionizable gas therebetween. The other end of each anode has a photosensitive element thereon with each photosensitive element being connected to the respective anode and connected to an anode connector extending along the respective row. Interposed between the photosensitive elements and the source of illumination therefor are electrically operable shutters in the form of liquid crystal films which can be energized so as to be substantially opaque or substantially transparent.

The cathodes are successively addressed during the addressing of each anode with the anodes also being successively addressed and the electrically operable shutters in front of the photosensitive elements provides for the making of selected areas of the photosensitive elements effective. By using the shutters, the anodes can be interconnected in groups while the cathode array forms stepping cathodes so that a reduced number of terminals is ample for actuating the cathode array. The entire device has a reduced number of terminals and can be controlled and operated by simple external circuitry.

DETAILED DESCRIPTION OF THE INVENTION

Referring first to FIGS. 1 through 4, the device will be seen to comprise a first panel 10 and a second panel 12 in spaced parallel relation to panel 10 with a member 14 interposed between the panels. On the side of panel 12 facing away from panel 10, there is a pair of transparent plates, glass, for example, 16 and 18.

On the side of panel 10 facing panel 12, there is an array of cathodes 20 arranged in uniformly spaced parallel relation and each extending substantially the full heighth of the device and each having a terminal thereon.

The member 14 interposed between panels 10 and 12 sealingly engages the panels about the periphery thereof and is provided with ribs 22 dividing the space between the panels into elongated channels with each channel communicating with those adjacent thereto via a restricted opening 24. The space between the panels is filled with an ionizable gas, neon, for example, with trace elements therein, and the openings at 24 provide for the flow of gas ions from each chamber into those adjacent thereto when the respective chamber is ionized.

Panel 12 carries in distributed relation a plurality of anodes 26 with a column of anodes pertaining to each cathode and with the anodes being arranged in rows extending angularly to the cathodes. Each anode has one end exposed in a respective chamber between ribs 22 so as to be influenced only by the cathode at the other end of the chamber.

Figure 5:
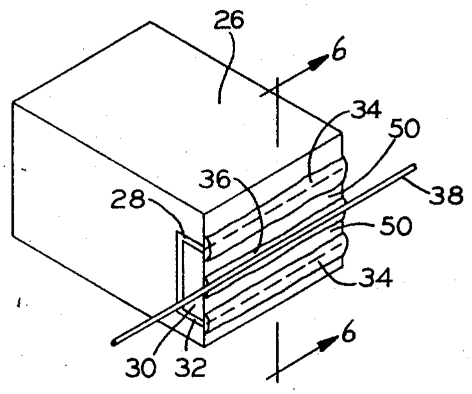
FIG. 5 is a perspective view showing a typical anode.

Each anode, as will be seen in FIG. 5, has a transverse groove 28 formed therein and mounted in the groove is a photosensitive element 30 with electrical insulation 32 isolating the element electrically from the anode 26. The anode 26 is electrically conductive, preferably formed of a metal having a low work function, such as molybdenum. The photosensitive element 30 is electrically connected along the edges to the anode 26 by the electrically conductive strips 34.

A further electrically conductive strip 36 extends across each photosensitive element in about the center and makes electrical connection with an anode connector 38 which extends completely across the respective row of anodes. Such a connector will be seen in FIG. 3 extending across the row of anodes and angularly to the cathodes 20.

The panel 12 may be made of any suitable material which is resistant to gas flow therethrough and in which anodes 26 can be insulatingly mounted. Panel 12 might be, for example, ceramic material or a combination of ceramic material with epoxy sealer thereon. Other materials also suggest themselves for this purpose.

Member 14 is advantageously formed of anodized aluminum but other materials can also be employed for this member.

The transparent plates 16 and 18 will be seen to be separated by a peripheral sealing member 40 so as to confine a space 42 therebetween extending over all of the photosensitive elements 30. On the face of panel 16 which faces panel 18, there is a tin oxide layer 44 and a similar tin oxide layer 46 is provided on the side of panel 18 which faces panel 16. Tin oxide film 44 is interrupted as indicated at 48 in FIGS. 4 and 1 so that each section of film 44 covers four rows of anodes.

The space between plates 16 and 18 is filled with a liquid crystal material which, as is known, becomes substantially transparent under one condition of energization of electrodes 44 and 46 and becomes substantially opaque under another condition of energization of the electrodes. The liquid crystal material with the confining electrodes can thus serve as shutters for exposing only selected parts of the scanning device. The tin oxide electrodes are thin enough to be substantially transparent and thus do not, in themselves, interfere with the passage of light through plates 16 and 18 to the photosensitive elements.

Figure 6:
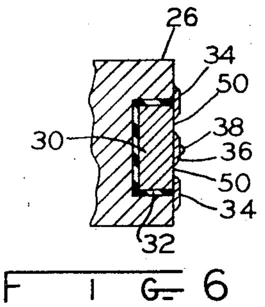
FIG. 6 is a sectional view indicated by line VI—VI on FIG. 5.

As will be seen in FIGS. 5 and 6, each photosensitive element has two strips 50 of the outer surfaces thereof exposed to receive light. These strips may be quite narrow and are in parallel between anode connector 38 and each anode 26.

Returning to FIG. 1, which shows the connections to the cathodes and anodes and to the electrodes 44 and 46, it will be seen that each cathode has a terminal projecting from the device along the top edge. The cathode terminal at the extreme left, indicated at 52, is a trigger terminal and upon receiving a pulse will cause ionization of the respective chamber and from which gas ions will flow into the next adjacent chamber so that thereafter when a pulse is supplied to the next adjacent terminal 54, this chamber will ionize.

After a pulse is supplied to terminal 52, successive pulses are supplied to terminals 54, 56, 58 and 60. It will also be seen in FIG. 1 that each of the terminals 54, 56, 58 and 60 is connected to every fourth cathode across the top of the device so that signals are simultaneously supplied to all of the cathodes connected to a respective terminal at one time. The only effective signal, however, is the one which is supplied to the cathode in a chamber next adjacent to the last ionized chamber.

Thus, by repetitively supplying signals to terminals 54, 56, 58 and 60, following the supply of signal to terminal 52, the chambers across the device can be caused to become successively ionized. After all of the chambers have been ionized, a signal is again supplied to terminal 52 and the process is repeated.

The signals supplied to the cathode terminals are derived from a gate G1 which receives power from one side of a power source PS1 with the gate under the control of a source of clock pulses, merely indicated as a clock.

The anode connectors also each have a terminal and, as will be seen, each anode is connected to every eighth anode along the side of the device, thus providing for eight anode terminals. Signals are supplied successively to the eight anode terminals through a gate G2 from the other side of power source PS1 with gate G2 being under the control of signals from trigger cathode terminal 52.

For each cycle during which the cathodes are all addressed, a single anode terminal is addressed. In order effectively to separate the groups of anodes from each other, the electrically operable shutters previously referred to are provided. These shutters are operated from a second power source PS2, one side of which is connected to electrode 46 and the other side of which is connected through a gate G3 with the several parts of electrode 44. Gate G3 is operated in synchronism with gates G1 and G2 and may receive a signal from trigger cathode terminal 52 via a 4 to 1 down counting component.

With the described arrangement, the shutter at the top of the device is open during the addressing of the first four anode rows, then the second one opens during the addressing of the next four anode rows and so on down the device to the bottom. By using the shutters, it is possible substantially to reduce the number of anode terminals thereby simplifying the external circuitry of the device.

It is contemplated to provide a further row of anodes completely at the bottom of the device which are directly connected to a respective anode connector 62 which receives signals from gate G2, consequently, a signal will be supplied to the further row of anodes completely at the bottom of the device which will establish at least a partially ionized condition in all of the chambers thereby making the stepping of the cathodes more certain.

Figure 7:
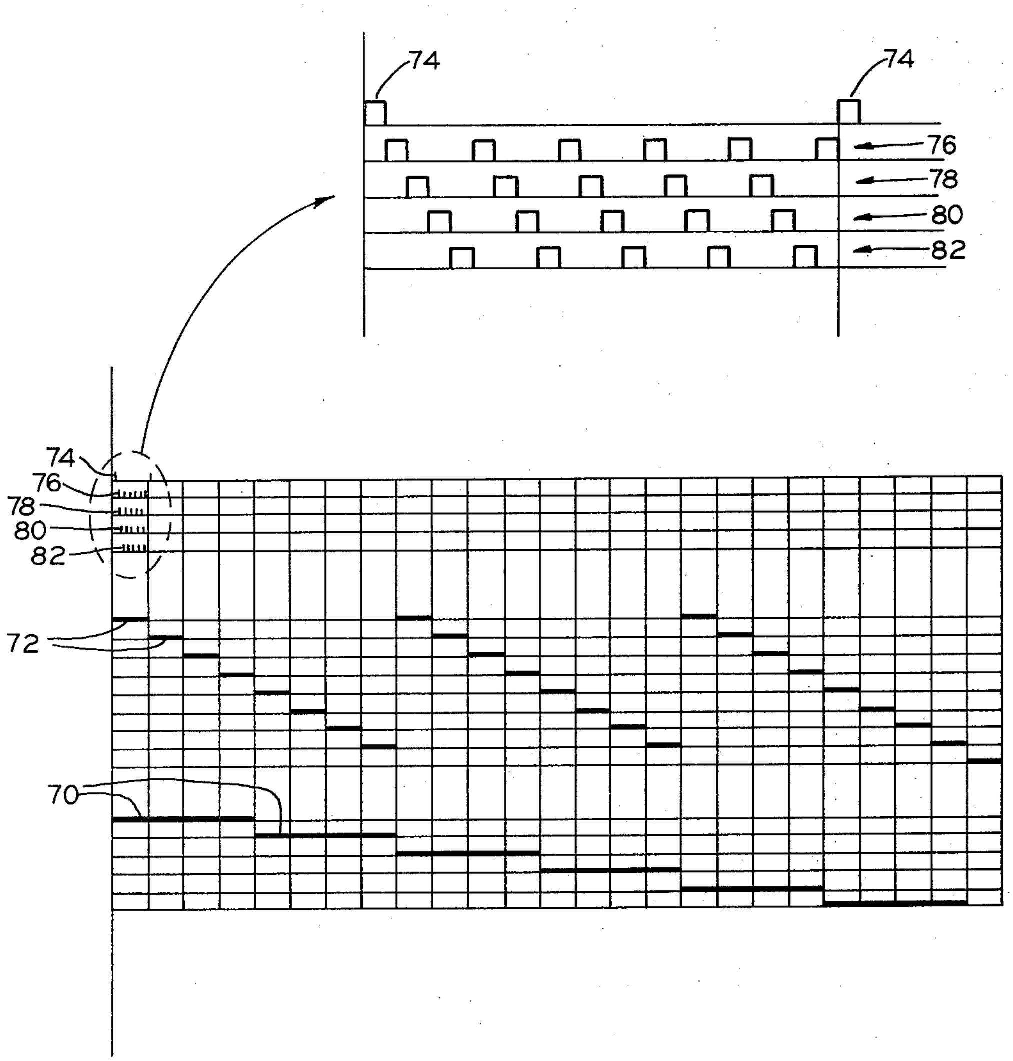
FIG. 7 is a diagram of a typical pulse sequence for the device.

The aforementioned pulses or signals to the various connections is schematically illustrated in FIG. 7. In FIG. 7, the signals indicated at 70 are the signals supplied to the parts of electrode 44. It will be seen that during the duration of each signal 70, there are four signals 72 which are supplied to the anode terminals from gate G2. It will be further seen that during the interval of each signal 72, there is a signal 74 to trigger cathode terminal 52 and then signals 76, 78, 80 and 82 are repetitively supplied to terminals 54, 56, 58 and 60 respectively.

By the supply of signals in the aforesaid manner, only a single anode row is effective during the addressing of the entire array of cathodes with the anode rows becoming successively effective. The provision of the electrically operable shutters permits the anodes to be addressed in groups with only that row of the anodes so addressed being effective which is disposed behind a shutter section which is actuated into open position.

It will be apparent that the circuitry pertaining to the device is quite simple and uses substantially conventional, inexpensive components. When the device is scanning printed material of any sort, or when an oscilloscope trace or any other source of light is directed toward the front of the device, and the cathodes and anodes are addressed in the aforementioned manner, together with the described actuation of the shutters, a usable signal can be established by, for example, placing a resistor R in one of the lines leading from power source PS1 and measuring the voltage drop thereacross.

If a photosensitive element being scanned at any instant is dark, there will be little or no current flowing through resistor R, but if the photosensitive element is light, then a substantial current will flow, thus providing for appreciable voltage changes across resistor R.

It will be apparent, also, that the device is capable of detecting degrees of light and, thus, is effective in respect of gray scales and the like.

The signal taken off across resistor R can be employed in any desired manner and can, if desired, be fed into a device similar to that illustrated herein for the purpose of creating a visible or readable display.

Modifications may be made within the scope of the appended claims.

What is claimed is:

1. In a scanning device; first and second panels in spaced relation confining a sealed space containing an ionizable gas, an array of elongated cathodes in spaced parallel relation on said first panel and each having a terminal, an array of anodes carried by said second panel in columns registering with said cathodes and rows extending angularly to said cathodes, each anode having one end exposed toward the respective cathode, means in said space forming chambers each containing a cathode and a column of anodes, a photosensitive element at the other end of each anode having an illuminatable surface, means electrically connecting a first region of each surface to the respective anode, an anode terminal extending along each row of anodes, means electrically connecting each anode terminal to a second region of each said surface of the respective row and spaced from said first region to expose a part of each said surface, a plurality of electrically operable shutter means each shielding a predetermined number of rows of said surfaces, first means for addressing said anode terminals in succession from one side of a first power source commencing at one extremity of said anode array, second means operable while each anode terminal is addressed for addressing said cathode terminals in succession from the other side of said first power source commencing at one edge of said cathode array, and third means for addressing said shutter means in succession from said one extremity of said anode array toward the other, the addressing of each said shutter means being maintained at least during the addressing of the anode terminals pertaining to the surfaces shielded by the respective shutter means.

2. A scanning device according to claim 1 which includes means affording communication between said chambers for the flow of gas ions from each chamber to the chambers adjacent thereto, said cathodes comprising a trigger cathode at one edge of the cathode array and $n$ cathodes adjacent thereto, the terminal of each of said $n$ cathodes being electrically connected to the terminal of every $n$th cathode across the array, said first means comprising means to address the terminal of said trigger cathode and then repetitively to address the terminals of said $n$ cathodes in succession.

3. A scanning device according to claim 1 in which each anode terminal is electrically connected to every $m$th anode terminal along the rows of anodes and said second means comprises means to repetitively address the first $m$ anode terminals in succession.

4. A scanning device according to claim 1 which includes means affording communication between said chambers for the flow of gas ions from each chamber to the chambers adjacent thereto, said cathodes comprising a trigger cathode at one edge of the cathode array and $n$ cathodes adjacent thereto, the terminal of each of said $n$ cathodes being electrically connected to the terminal of every $n$th cathode across the array, said first means comprising means to address the terminal of said trigger cathode and then repetitively to address the terminals of said $n$ cathodes in succession, and in which each anode terminal is electrically connected to every $m$th anode terminal along the rows of anodes and said second means comprises means to repetitively address the first $m$ anode terminals in succession.

5. A scanning device according to claim 3 in which each shutter covers $m/2$ rows of anodes.

6. A scanning device according to claim 1 which includes means affording communication between said chambers for the flow of gas ions from each chamber to the chambers adjacent thereto, said cathodes comprising a trigger cathode at one edge of the cathode array and $n$ cathodes adjacent thereto, the terminal of each of said $n$ cathodes being electrically connected to the terminal of every $n$th cathode across the array, said first means comprising means to address the terminal of said trigger cathode and then repetitively to address the terminals of said $n$ cathodes in succession, and in which each anode terminal is electrically connected to every $m$th anode terminal along the rows of anodes and said second means comprises means to repetitively address the first $m$ anode terminals in succession, each said shutter covering $m/2$ rows of anodes.

7. A scanning device according to claim 1 which includes a further row of anodes at one extremity of the anode array, a further anode terminal electrically connected directly to said further anodes, and means for addressing said further anode terminal between cycles of addressing the first mentioned anode terminals.

8. A scanning device according to claim 1 in which each said shutter means comprises a liquid crystal film.

9. A scanning device according to claim 1 which includes a pair of transparent panels in spaced parallel coextensive relation covering said photosensitive elements and sealed together, liquid crystals in the space between said transparent panels, and transparent electrodes on the sides of said transparent panels which face each other.

10. A scanning device according to claim 9 in which at least one of said electrodes has regions of discontinuity therein parallel to said rows of anodes and located between predetermined rows of said photosensitive elements.

11. A scanning device according to claim 4 which includes a source of clock pulses, first gate means under the control of said clock pulses and interposed between said first power source and said cathode terminals, and second gate means under the control of signals supplied to the terminal of said trigger cathode and interposed between said first power source and said anode terminals.

12. A scanning device according to claim 11 which includes a third gate under the control of said clock pulses and interposed between said second source of power and said shutter means.

13. In a scanning device which includes a plurality of photosensitive elements arranged in rows and columns, for sensing the light of an image, a connector for each row connected to each element in the respective row, said rows being arranged in successive groups, shutter means interposed between each group and the source of illumination therefor, terminals connected to each said shutter means, and means connected to said terminals for repetitively addressing said terminals in succession for successively actuating said shutter means into open position with one shutter means being open during each cycle of addressing said terminals of said groups.

14. A scanning device according to claim 13 in which each shutter means comprises a pair of adjacent shutters each pertaining to $m/2$ rows of elements, the shutters of successive pairs of shutters being actuated in succession during successive addressing of said m terminals.

15. A scanning device according to claim 13 in which said shutter means comprises a liquid crystal film and said means for actuating said shutter means comprises transparent electrode means for each shutter means between which said film is contained and means for selectively establishing and interrupting a voltage across said electrode means.

* * * * *